United States Patent [19]

Jackson

[11] 4,337,639

[45] Jul. 6, 1982

[54] GAS VOLUME FLOW RATE MEASUREMENT APPARATUS

[75] Inventor: Andrew C. Jackson, Davis, Calif.

[73] Assignee: The Children's Hospital Medical Center, Boston, Mass.

[21] Appl. No.: 126,125

[22] Filed: Feb. 29, 1980

[51] Int. Cl.[3] .................. G01F 1/72; G01F 25/00
[52] U.S. Cl. .......................................... 73/3; 73/269
[58] Field of Search .................. 73/3, 4 R, 262, 269, 73/861.02, 861.03; 222/71, 3; 128/205.23

[56] References Cited

U.S. PATENT DOCUMENTS

| | | | |
|---|---|---|---|
| 899,959 | 9/1908 | Dornin | 73/3 |
| 1,061,271 | 5/1913 | Dezendorf | 7/3 |
| 1,678,564 | 7/1928 | Eldred | |
| 3,256,876 | 6/1966 | Elam | 128/205.23 |
| 3,259,272 | 7/1966 | Larson | |
| 3,411,351 | 11/1968 | Schwartz | 73/149 |
| 3,834,381 | 9/1974 | Peterson | 73/861.02 X |

OTHER PUBLICATIONS

"Evaluation of Three Types of Respiratory Flowmeters" by Fry et al. from J. Appl. Physiol., 10(2), pp. 210–214, Mar. 1957.

"Frequency Response of Pneumotachographs" Bulletin Physio-Path, 1972 by Peslin et al.

*Primary Examiner*—James J. Gill

[57] ABSTRACT

Apparatus for measuring gas volume delivered at rapidly varying flow rates, over wide ranges of frequency of variation in flow rates, having a chamber with an outlet, means for varying the chamber volume to cause a volume of gas to be delivered from the outlet, and means for measuring changes in the pressure in and volume of the chamber during the varying, so that the volume of gas delivered therefrom can be derived.

14 Claims, 4 Drawing Figures

GAS VOLUME FLOW RATE MEASUREMENT APPARATUS

The invention described herein was made in the course of work under a grant or award from the Department of Health and Human Services.

BACKGROUND OF THE INVENTION

This invention relates to measuring rapidly varying air flow.

The need for such measurement arises in testing the accuracy of transducers in air flow, volume, and pressure measuring equipment, and in generating measured air flows, e.g., for respiratory application to a patient undergoing medical treatment. For the former application, it is desirable to be able to measure the transducer's response at high frequencies of air flow rate variation. For the latter application, it is desirable to measure accurately and conveniently the volume of gas delivered over a wide range of frequencies of air flow rate variation.

Emerson U.S. Pat. No. 2,918,917 describes the generation of high frequency air pulses with a diaphragm in a chamber. Pressure in the delivery tube to the patient is displayed on a gauge, and a pressure vent in that tube can be opened or closed with the thumb.

Venegas U.S. Pat. No. 4,155,356 shows various ways to generate a series of air pulses, including a movable diaphragm. Pulse control is by manually operated dials, cardiac measurements, and a pressure measurement made inside the patient.

SUMMARY OF THE INVENTION

In general, the invention features apparatus for measuring gas volume delivered at rapidly varying flow rates, over wide ranges of frequency of variation in flow rates; the apparatus has a chamber with an outlet, means for varying the chamber volume to cause a volume of gas to be delivered from the outlet, and means for measuring changes in the pressure in and volume of the chamber during the varying, so that the volume of gas delivered therefrom can be derived.

In preferred embodiments, the chamber has a loudspeaker as a common wall with a second closed chamber, means for vibrating the speaker so that changes in the volume of the chambers are equal and opposite, and means for measuring the pressure in the second chamber; the outlet is adapted for attachment to a volume or flow transducer whose output is compared to the derived delivery volume to test the transducer; alternatively, the outlet is adapted for attachment to means for delivering the gas to a patient; the pressure measurement means include means for converting the pressure measurement to electrical signals and the apparatus includes means for calculating the derived volume from those signals.

DESCRIPTION OF THE PREFERRED EMBODIMENTS

We turn now to the preferred embodiments of the invention, first briefly describing the drawings thereof.

Drawings

Figure 1:
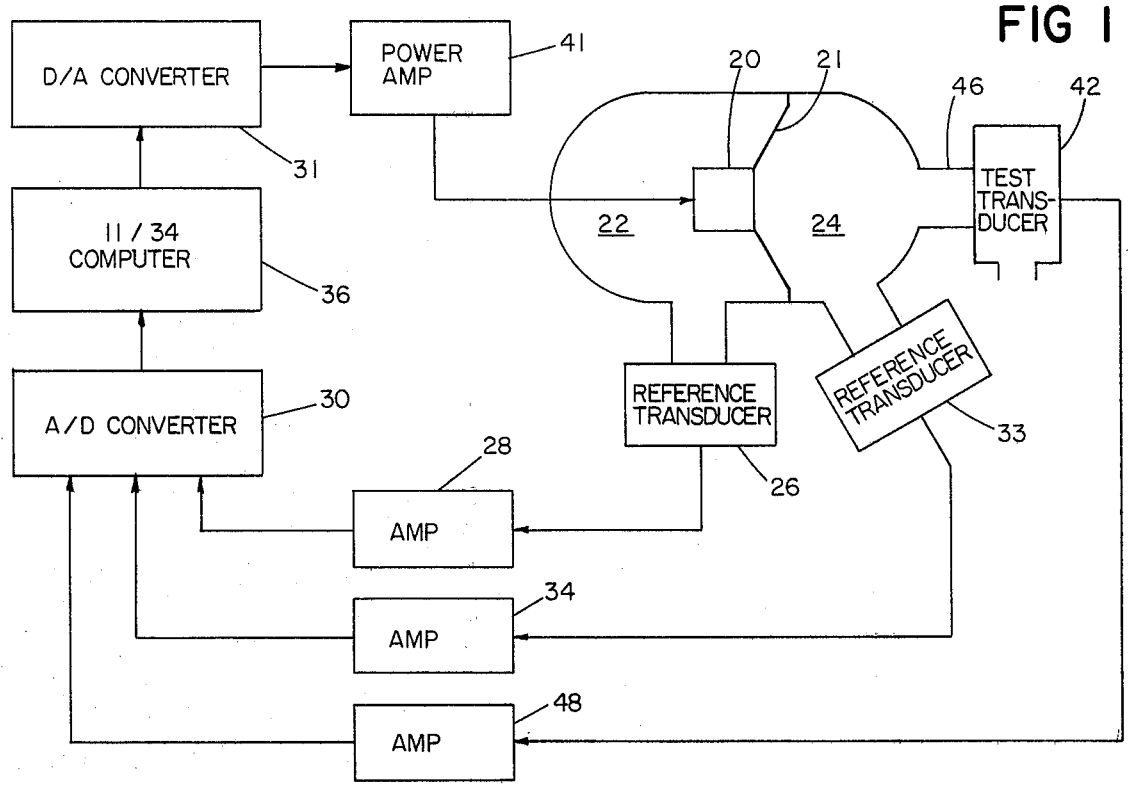
FIG. 1 is a schematic diagram of a device for testing volume or flow transducers.
Figure 2:
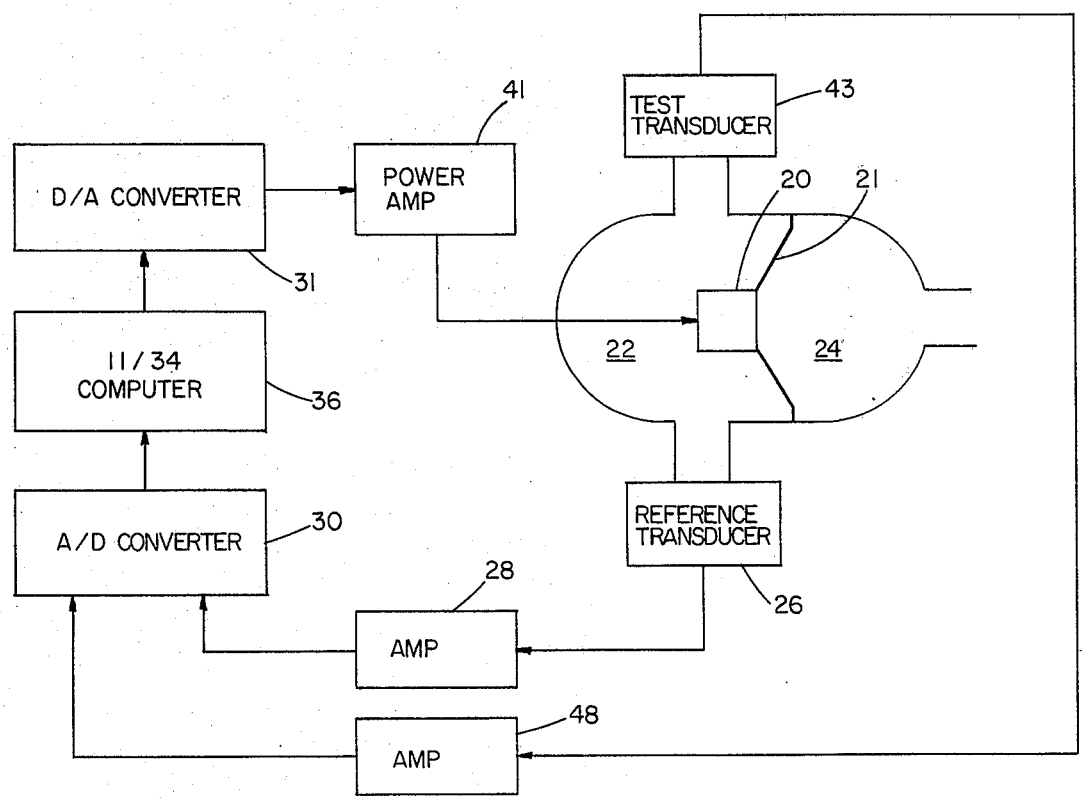
FIG. 2 is a schematic diagram of a device for testing a pressure transducer.
Figure 3:
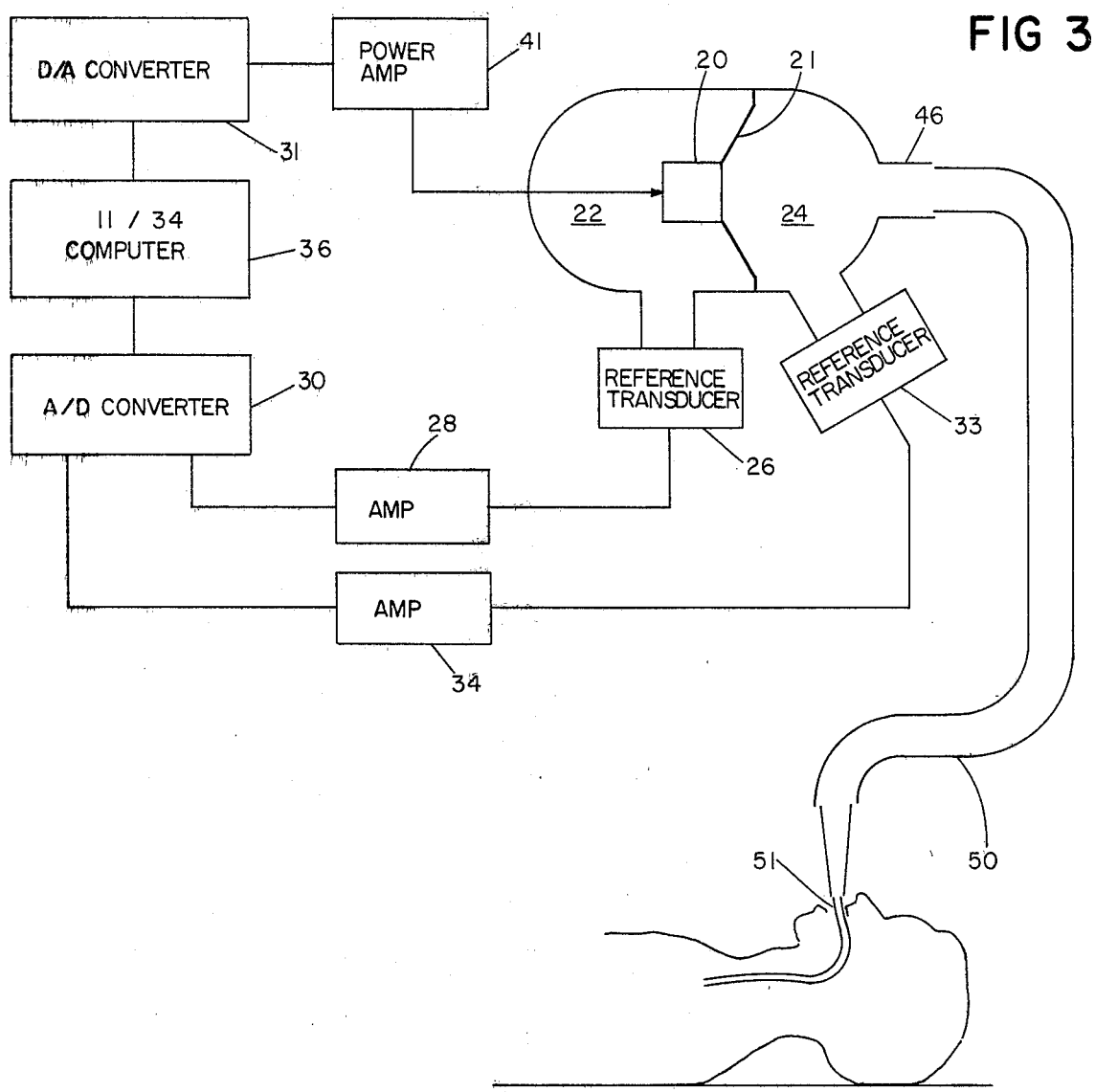
FIG. 3 is a schematic diagram of a device for ventilating a patient.
Figure 4:
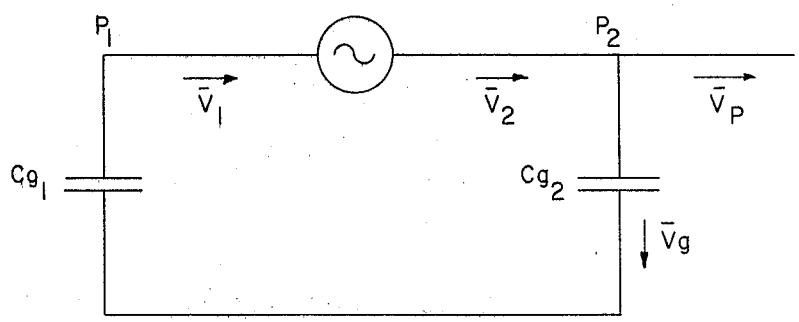

FIG. 4 a diagram of an electrical system analogous to the mechanical systems of FIGS. 1-3.

STRUCTURE

FIGS. 1-3 schematically show loudspeaker 20 (Trusonic BOA 80) with cone 21 separating sealed chamber 22 from chamber 24. The only outlet from chamber 24 is outlet 46. Reference pressure transducers 26 and 33 (Serta, Model 239) are connected respectively to chambers 22 and 24, and their outputs are respectively connected through amplifiers 28 and 34 (Ithaco, model 451) to digitizer 30 (Digital Equipment Corp. AD11-K). The digitized output is stored and analyzed in computer 36 (PDP 11/34).

Loudspeaker 20 is driven in a sinusoidal wave function generated by computer 36, converted by digital analogue converter 31 (DEC, model AA11-K) and amplified by amplifier 41 (Crown Model D-150A).

In FIG. 1, the transducer 42 to be tested is connected to the outlet 46 of chamber 24. The output of transducer 42 is fed to computer 36 through amplifier 48.

In FIG. 2, the pressure transducer 43 to be tested is connected to chamber 22, and its output is fed to computer 36 through amplifier 48.

In FIG. 3, outlet 46 of chamber 24 communicates with flow tube 50 having a mouthpiece 51 for ventilating a patient.

Operation

The pressure in chamber 22, $p_1$, is a function of the volume displacement, $\Delta v_1$, of the speaker cone 21. From the ideal gas law the pressure $p_1$ can be expressed as, $$p_1 = \beta(P_{atm}/V_1)\Delta v_1 \tag{1}$$

where $P_{atm}$ = atmospheric pressure, and $V_1$ = volume of chamber 22. Compressions are adiabatic, making $\beta$, in air, equal to 1.4, where volume is measured in liters and pressure is measured in cm $H_2O$. Thus, by measuring the pressure in chamber 22, one can estimate the volume displacement produced by the speaker cone from the relationship $$\Delta v_1 = -(V_1/\beta P_{atm})p_1. \tag{2}$$

The motion of the speaker cone will produce equal, but opposite, volume changes in the two chambers: $\Delta v_1 = -\Delta v_2$. Since chamber 22 is sealed, speaker motion will only change its pressure. However, in chamber 24 speaker motion can raise the pressure, $P_2$, and/or move gas through the outlet 46. If $\Delta v_g$ is the volume change associated with gas compression in chamber 24 and $\Delta v_p$ is the volume of gas that is moved through the outlet then, $$\Delta v_2 = \Delta v_g + \Delta v_p. \tag{3}$$

The amount of volume change associated with gas compression in chamber 24 is given by $$\Delta v_g = -(V_2/\beta P_{atm})P_2. \tag{4}$$

From equations 2, 3, and 4, we can derive the following expression for the volume displaced through the outlet in terms of the pressures in the two chambers;

$$\Delta v_p = (1/\beta P_{atm})(V_1 p_1 + V_2 p_2). \quad (5)$$

The derivative of $\Delta v_p$ with respect to time is just the volume flow rate through the outlet, or $$\dot{V}_p = d\Delta v_p/dt = (V_1 dp_1/dt + V_2 dp_2 dt)/(\beta p_{atm}). \quad (6)$$

In order to derive an expression for sinusoidal volume changes, it is useful to compare this mechanical system to an analogous electrical circuit, given in FIG. 4, where voltage is the analog of pressure and current is the analog of flow. If the induced volume changes are sinusiodal, the current (flow) through the branch representing the port is described in terms of the voltage (pressure) at nodes 1 and 2 by, $$\dot{V}_p = j\omega(C_{g1}p_1 + C_{g2}p_2) \quad (7)$$

where $\omega$ = angular frequency, rad/sec, $j = \sqrt{-1}$, $C_{g1}$ = gas compression compliance in chamber 22, $V_1/(\beta P_{atm})$ and $C_{g2}$ = gas compression compliance in chamber 24, $V_2/(\beta P_{atm})$. Thus, measures of the pressures in chambers 22 and 24 provide enough information so that either the volume (from equation 5) or the flow (from equation 6) through the port can be estimated.

In FIG. 1 the frequency response of volume transducer 42 can be measured by oscillating the loudspeaker at the desired frequencies, and comparing the output of the transducer to the volume computed from equation (5). To measure the frequency response of a pneumotachometer (measuring air flow rate) connected to the outlet in chamber 24, the loudspeaker is oscillated at the desired frequencies, and the electrical output of the transducer is compared to the flow computed from equation (7).

The signals from the reference transducers $p_1$ and $p_2$, as well as the signal coming from the transducer being tested, are of the form, $$f_i(t) = A_i \sin(\omega t + \theta_i) + B_i \cos(\omega t + \theta_i),$$

where $i=1$ for $p_1$, $i=2$ for $p_2$, and $i=3$ for the test transducer signal. The sine and cosine components of such signals can be computed by the relationships, $$A_i = \tfrac{1}{2}\pi \int_0^{2\pi} \sin(\omega t) f_i(t)\, dt \quad (8)$$

and, $$B_i = \tfrac{1}{2}\pi \int_0^{2\pi} \cos(\omega t) f_i(t)\, dt \quad (9)$$

Discretized forms of integral equations (8) and (9) are given by, $$A_i = 2/N \sum_{n=1}^{N} \sin(2n\pi/N) f_i(n) \quad (10)$$

and, $$B_i = 2/N \sum_{n=1}^{N} \cos(2n\pi/N) f_i(n) \quad (11)$$

where N=total number of sample per cycle. At each frequency at least nine cycles are generated. The response during the first cycle is ignored because of possible transients due to changing the frequency. During the next eight cycles the three input signals are sampled at ten equally spaced times per cycle (thus, in equations 10 and 11, N=10). The eight sets of ten data points from each separate channel at each frequency are then ensemble averaged (5). The sine and cosine components of each channel are estimated using equations (10) and (11) where $f_i(n)$ (for $n=1, 10$) is the ten-point ensemble average for each channel. The frequency response of a pressure transducer is then computed by the complex ratio, $(A_3+jB_3)/(A_1+jB_1)$. The response of a volume transducer is computed from $(A_3+jB_3)/\Delta v_p$ where $\Delta v_p$ is computed from equation (5) with $P_1 = A_1+jB_1$ and $P_2 = A_2+jB_2$. The response of a pneumotachometer is computed from $(A_3+jB_3)/\dot{V}_p$ where $\dot{V}_p$ is computed from equation (6) with $p_1 = A_1+jB_1$ and $p_2 = A_2+jB_2$.

Other Embodiments

Other embodiments are within the following claims. As just one example, while solutions of equations (5) and (6) alone require pressure measurements in both chambers, it is not necessary that transducers 26 and 33 both be reference transducers. A reference transducer can be used to compensate an ordinary transducer (e.g., a Validyne, model MP45) by connecting both transducers to chamber 22 and developing a compensation factor.

I claim:

1. Apparatus for measuring gas volume delivered at rapidly varying flow rates, over wide ranges of frequency of variation in said flow rates, comprising
    a chamber having an outlet,
    means for varying the volume of said chamber to cause a volume of gas to be delivered from said outlet, and
    means for measuring changes in the pressure in and volume of said chamber during said varying, so that the volume of gas delivered therefrom can be derived,
    wherein said means for measuring the changes in the volume of said chamber comprises
    a second closed chamber,
    means for subjecting said second chamber to variations in volume equal in magnitude to and simultaneous with said volume variations in said first chamber, and
    means for measuring the pressure in said second chamber.

2. The apparatus of claim 1 wherein said second chamber has said diaphragm as a common wall with said first chamber, so that changes in the volume of said chambers are equal and opposite.

3. The apparatus of claim 2 wherein said means for measuring the volume of said second chamber comprises a means for measuring the pressure in said second chamber, from which said volume is derived.

4. The apparatus of claim 3 wherein said means for measuring the pressure in said first and second chamber comprise means for converting said pressure measurement to electrical signals, said apparatus including means for electronically calculating said derived volume from said signals.

5. The apparatus of any of claims 1-3 wherein said outlet is adapted for attachment to means for delivering said gas to a patient.

6. The apparatus of claim 5 including means for varying said first chamber volume sinusoidally over time, said derived volume being electronically calculated according to the equation of claim 14.

7. The apparatus of any of claims 3–5 wherein said outlet is adapted for attachment of a test transducer, said apparatus including means of comparing the output of said test transducer to said derived volume, so that the accuracy of said test transducer is measured.

8. The apparatus of claim 7 wherein said test transducer is a volume transducer.

9. The apparatus of claim 7 wherein said test transducer is a flow transducer.

10. The apparatus of claim 7 wherein said pressure and volume measurements are converted to electrical signals and said comparison means includes a means of electronically calculating said derived volume from said pressure measurement signals and comparing said derived volume to said volume measurement signal.

11. The apparatus of any of claims 1–3 or 4 wherein said second chamber is adapted for attachment to a test pressure transducer, said apparatus including means of comparing the output of said test pressure transducer to said means for measuring the pressure in said second chamber.

12. The apparatus of any of claims 1–3 or 4 wherein said outlet is adapted for attachment of a test transducer, said apparatus including means of comparing the output of said test transducer to said derived volume, so that the accuracy of said test transducer is measured, said pressure and volume measurements are converted to electrical signals and said comparison means includes a means of electronically calculating said derived volume from said pressure measurement signals and comparing said derived volume to said volume measurement signal, and said apparatus including means for varying said first chamber volume sinusoidally over time, and said derived volume being calculated from the equation $v_p = j\omega(C_{g1}P_1 + C_{g2}P_2)$ where $\omega$ = angular frequency in rad./sec., $j = \sqrt{-1}$, $C_1$ = gas compression compliance in said second chamber and $C_2$ = gas compression compliance in said first chamber.

13. The apparatus of claim 1 wherein said diaphragm and vibrating means comprise an electro-accoustical transducer.

14. The apparatus of claim 13 wherein said electro-accoustical transducer comprises a loud speaker.

* * * * *